(12) United States Patent
Musselman (10) Patent No.: US 8,983,420 B2
(45) Date of Patent: Mar. 17, 2015

(54) CIRCULAR ANTENNA ARRAY FOR SATELLITE COMMUNICATION INTERFERENCE REJECTION

(75) Inventor: Randall Lee Musselman, Colorado Springs, CO (US)

(73) Assignee: The United States of America as Represented by the Secretary of the Air Force, Washington, DC (US)

(*) Notice: Subject to any disclaimer, the term of this patent is extended or adjusted under 35 U.S.C. 154(b) by 457 days.

(21) Appl. No.: 13/563,088

(22) Filed: Jul. 31, 2012

(65) Prior Publication Data

US 2013/0035052 A1    Feb. 7, 2013

Related U.S. Application Data

(60) Provisional application No. 61/513,822, filed on Aug. 1, 2011.

(51) Int. Cl.
| | | |
|---|---|---|
| *H04B 1/06* | (2006.01) | |
| *H01Q 3/26* | (2006.01) | |
| *G01S 19/21* | (2010.01) | |
| *G01S 19/36* | (2010.01) | |
| *H01Q 3/34* | (2006.01) | |
| *H01Q 21/06* | (2006.01) | |

(52) U.S. Cl.
CPC .............. *H01Q 3/2617* (2013.01); *G01S 19/21* (2013.01); *G01S 19/36* (2013.01); *H01Q 3/34* (2013.01); *H01Q 21/065* (2013.01)

USPC ..................................... 455/278.1; 455/277.2

(58) Field of Classification Search
CPC . H01Q 21/061; H01Q 21/064; H01Q 21/065; H01Q 3/2617; H01Q 3/34
USPC ............................................. 455/278.1, 277.2
See application file for complete search history.

(56) References Cited

U.S. PATENT DOCUMENTS 5,924,020 A * 7/1999 Forssen et al. ................ 455/129
7,724,981 B2 * 5/2010 Curtis ........................... 382/274

* cited by examiner

*Primary Examiner* — Wesley Kim
*Assistant Examiner* — Raj Chakraborty
(74) *Attorney, Agent, or Firm* — AFMCLO/JAZ; Charles Figer, Jr.

(57) ABSTRACT

An antenna array system and method is provided for reducing interference from a source moving relative to the antenna array system. The antenna array system includes a receiver and a plurality of antenna array elements arranged in a planar array. Each of the plurality of antenna array elements is in electrical communication with the receiver and in a locationally fixed position relative to the receiver. The plurality of antenna array elements receives a desired signal and interference from the source moving relative to the antenna array system. The receiver is configured to detect a presence of the interference. In response to the detection of the presence of the interference, the receiver is further configured to steer a deep antenna-pattern null in a direction of the interference.

7 Claims, 6 Drawing Sheets

CIRCULAR ANTENNA ARRAY FOR SATELLITE COMMUNICATION INTERFERENCE REJECTION

CROSS-REFERENCE TO RELATED APPLICATIONS

This application claims the benefit of and priority to U.S. Provisional Application Ser. No. 61/513,822, entitled "Circular Antenna Array for Satellite Communication Interference Rejection," filed on 1 Aug. 2011, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The invention is related to antennas, and more particularly, to reducing interference received by the antennas.

2. Description of the Related Art

Electromagnetic interference can disrupt mobile communications in both military and commercial mobile applications. This is especially true when a high-power terrestrial source is in close proximity to the mobile satellite receiver. This can be especially problematic when the mobile receiver passes fixed high-power radio sources, or perhaps even more problematic, when a military vehicle is in the presence of a radar or jamming source that is either onboard or on a nearby vehicle within the same convoy. In this case, the local interfering signal would likely overpower the weak satellite signal, even if that interfering signal were out of the frequency band of the desired signal's channel, due to non-ideal filtering. To exacerbate this problem, many of these jamming sources are ultra wideband (UWB) and consist of electromagnetic energy spread over a very large bandwidth that may overlap the frequency channel of the desired satellite signal. In this case, even the fraction of the UWB interfering power that is in-band could potentially overpower the desired satellite signal.

When a satellite receiver is subjected to such interferences, antennas can be chosen with radiation patterns that favor the direction of the satellite signal, while rejecting signals coming from known interference. However, if the direction of interference is continually changing, as in a mobile application, this fixed antenna pattern is not useful. Mechanically steered antennas are too cumbersome and slow, and the moving parts are susceptible to reliability problems. In-band filtering inside the satellite receiver is ineffective, because this in-band filtering may also filter out the desired satellite signal. Filtering in the receiver may assist with adjacent-channel interference; however, non-ideal filtering may still allow adjacent-channel interference that can render the satellite communications unusable.

Accordingly, there is a need in the art for an antenna array, which assists in reducing the above referenced interferences.

SUMMARY OF THE INVENTION

Embodiments of the invention address the need in the art by providing an antenna array system for reducing interference from a source moving relative to the antenna array system. The antenna array system includes a receiver and a plurality of antenna array elements arranged in a planar array. Each of the plurality of antenna array elements is in electrical communication with the receiver and in a locationally fixed position relative to the receiver. The plurality of antenna array elements receives a desired signal as well as interference from the source moving relative to the antenna array system. The receiver is configured to detect a presence of the interference. In response to the detection of the presence of the interference, the receiver is further configured to steer a deep antenna-pattern null in a direction of the interference.

Some particular embodiments utilize a low-profile phased-array antenna system that includes a circular planar array of six circular patch antennas, as radiating elements. A radiation pattern for one embodiment is achieved with an array radius of 0.2 wavelengths, which requires significant size reduction of the circular patches. This size reduction for this embodiment was achieved by carefully tuning slits in the radiating patches. A separate receiver detects a presence and location of an interferer and automatically selects an appropriate phase of each radiating element in order to steer the antenna-pattern null toward the interference. Embodiments of the invention are relatively small in terms of wavelength, and may be placed on top of a vehicle or may be switched between multiple sources. The embodiments have no moving parts, and are capable of automatically steering the null, while the interference is moving relative to the satellite receiver.

An alternate embodiment of the antenna array system for reducing interference from a source moving relative to the antenna array system includes a first beam-forming network, a second beam-forming network, and a plurality of antenna array elements arranged in a planar array. Each of the plurality of antenna array elements is in electrical communication with the first and second beam forming networks and in a locationally fixed position relative to the first and second beam forming networks. The plurality of antenna array elements receives a desired signal as well as interference from the source moving relative to the antenna array system. The first beam-forming network is configured to continuously rotate a first deep antenna-pattern null in azimuth while recording a received power level. The first beam-forming network is further configured to determine a direction of the interference from the received power level. The second beam-forming network is configured to then lock a second deep antenna-pattern null toward the interference direction determined by the first beam-forming network.

A method of reducing interference received from a source moving relative to an antenna array system is also provided. The antenna array system includes a receiver and a plurality of antenna array elements arranged in a planar array, where each of the plurality of antenna array elements in electrical communication with the receiver and in a locationally fixed position relative to the receiver. The method includes detecting a presence of the interference received by the plurality of antenna array elements, and in response to the detection of the presence of the interference, adjusting phase shifts of each of the plurality of antenna array elements to steer a deep antenna-pattern null in a direction of the interference.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Electromagnetic interference can disrupt mobile satellite communications in both military and commercial mobile applications. Not only is this true when a high-powered terrestrial source is in close proximity to a mobile satellite receiver, but it can be especially problematic when the vehicle or nearby vehicle has its own onboard interference source that overpowers the desired satellite signal. This can cause interference even if that interfering signal were out of the frequency band of the desired satellite signal, due to non-ideal filtering. To exacerbate this problem, many of these sources are ultra wide band (UWB), consisting of electromagnetic energy spread over a very large bandwidth that may overlap the desired satellite channel. When encountering such UWB sources, even the fraction of the UWB interfering power that is in-band could potentially overpower the satellite signal power.

Embodiments of the invention address the problems associated with electromagnetic interference by providing an antenna array, which allows a ground-based mobile satellite receiver to maintain a useable signal-to-interference ratio in the presence of a close proximity powerful interference source. The array is configured to detect the presence of the interference, its ability to degrade the intended signal's quality, and a direction of the interference. Upon interference detection, the array is further configured to automatically steer a deep antenna-pattern null in the direction of the interference, while simultaneously maintaining a near omnidirectional pattern in all other directions. The antenna-array continuously adapts to any relative movement of the interference source with respect to the satellite receiver. The satellite receiver can be placed on a vehicle that drives by a stationary interference source, the interference source can drive by a stationary satellite receiver, or any combination of these two scenarios, and the antenna array will automatically adapt to this change in direction, with no moving parts. In addition to tracking interference sources that are moving relative to the array, it can also switch between multiple interference sources. The adaptive beam steering may be accomplished by electronically steering the antenna-pattern null by adjusting the required phase shifts, in order to attenuate only the interference and not the intended satellite signal. Embodiments of the array do not rely on filtering. Embodiments of the antenna array may be configured to allow satellite communication overhead, while simultaneously rejecting interference from other directions, by tracking and continuously steering an antenna pattern null in the direction of the interference.

Figure 1:
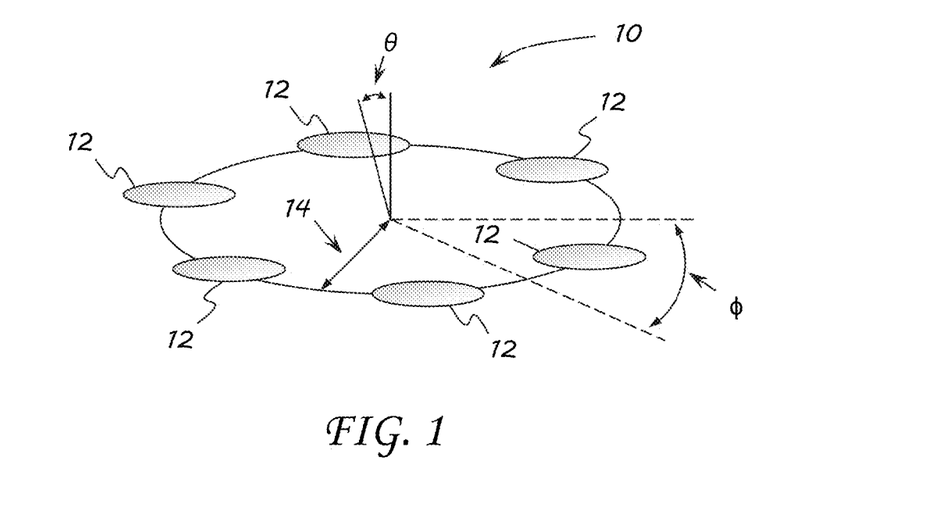
FIG. 1 is a diagrammatic representation of a six-element circular phased-array antenna with circular patch elements consistent with embodiments of the invention.

Turning now to the drawings, FIG. 1 illustrates an embodiment of the invention with an antenna array 10 having six-elements 12 arranged in a circular planar array, though other embodiments may have more or fewer elements. In a particular embodiment, the array elements may consist of circular patch antennas as the radiating elements, though other radiating elements may also be used. In this illustrated embodiment, six elements 12 were selected in order to achieve continuous antenna-pattern null steering in all horizontal (compass) directions. An array radius 14 of near 0.2 wavelengths, as shown in FIG. 1, was determined to create the deepest null in the antenna-pattern, however, other radii may be utilized depending on the type of radiating elements selected in other embodiments.

Figure 2:
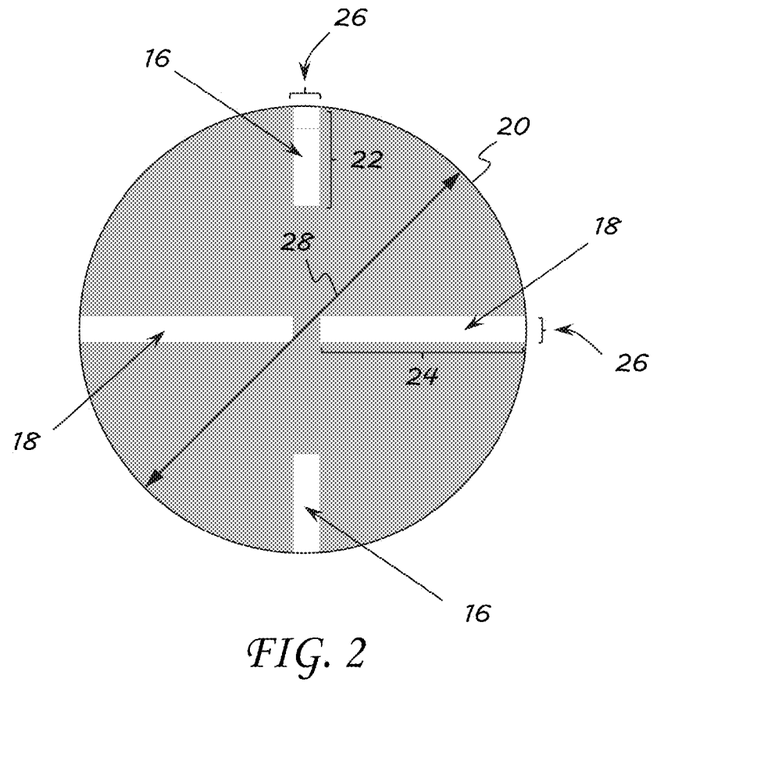
FIG. 2 is a mask of a radiating patch element in FIG. 1.
Figure 3A:
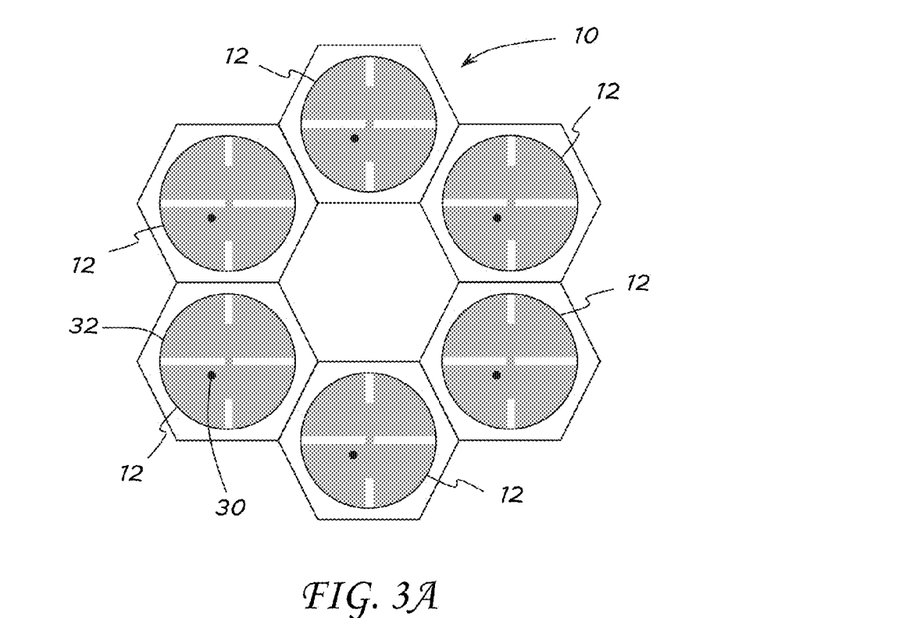
FIG. 3A is a diagrammatic representation of a six-element antenna array embodiment.
Figure 3B:
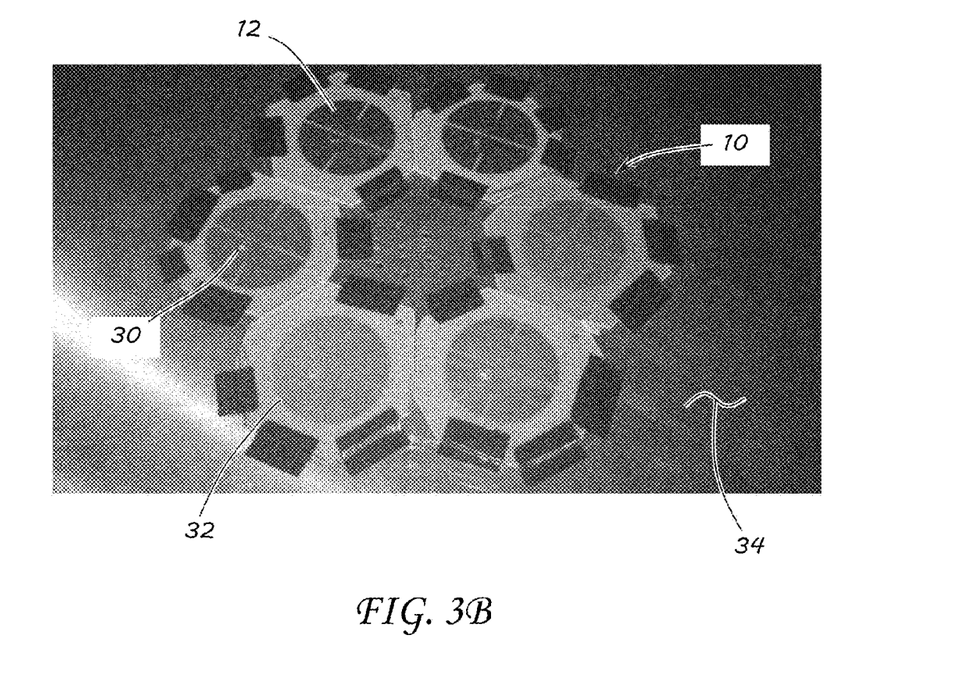
FIG. 3B is a photo of the six-element antenna array of FIG. 3A.

Since patch antennas are most efficient near one half of a wavelength, significant size reduction was required on the circular patch elements in order to fit six of them in the circular array. This size reduction was accomplished by using carefully tuned slits 16, 18 that were etched in the patches 12 as illustrated in FIGS. 2, 3A, and 3B. A mask 20 may be used to etch the slits 16, 18, as shown in FIG. 2. In the illustrated embodiment, the length 22 of slit 16 is approximately 0.067λ and the length 24 of slit 18 is approximately 0.127λ. Both slits 16, 18 have a slit width 26 of approximately 0.004λ. A diameter 28 of the mask 20 is approximately 0.134λ.

After etching of the patches 12, feed probes may be placed at locations 30 approximately 0.045λ from an outer edge 32 of the patches as seen in FIGS. 3A and 3B. These figures additionally show the tuned-slit circular patches 12 placed in the circular array 10. Fixed null directions may be programmed into the array 10 by programming appropriate phase shifts.

Any number of methods may be used to perform the phase shifts. In one embodiment, a CPU sends a digital code to a switch that is mounted on a printed circuit board (PCB). Many different paths may be etched on this same PCB. Based on software programming, the CPU sends a digital code to the switch in order to select a desired path length, and thus electrical phase. In this embodiment, each patch antenna has its own PCBs, per beam former. Each compass direction may be associated with a path length that corresponds to a desired electrical phase shift for each patch. When a new compass direction is elected, the CPU sends new digital codes (unique to each of the patches) to each of the phase shifter switches.

In an alternate embodiment, the phase-shifting operation may be performed by using voltage-controlled phase shifters purchased from MINI-CIRCUITS® of Brooklyn, N.Y. In this embodiment, the CPU sends a digital code to a digital-toanalog converter (DAC). The output voltage of the DAC controls the amount of electrical phase from the MINI-CIRCUITS® phase shifter. Similar to the embodiment discussed above, a DAC and phase shifter is associated with to each patch, for each pattern (beam former).

Figure 4A:
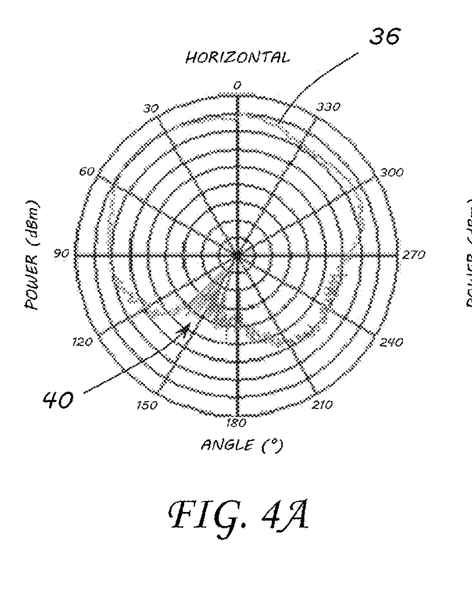
FIGS. 4A and 4B are polar graphs illustrating measured azimuth patterns of the antenna array in FIGS. 3A and 3B.
Figure 4B:
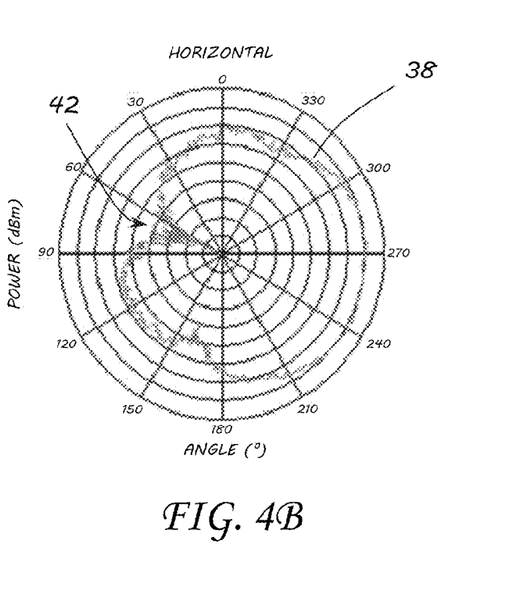

To test the embodiment of the array 10, the array 10 was placed on a turntable 34 in an anechoic chamber, as shown in FIG. 3B. The turntable 34 (and array 10) was rotated while measuring the received power. Horizontal radiation patterns 36, 38 for two null directions are shown in FIGS. 4A and 4B, illustrating approximately dB of null attenuation 40, 42 just in the horizontal plane. Next, the array 10 was repositioned so that the turntable 34 rotation would measure the elevation pattern of the array 10. The elevation pattern 44 in FIG. 5 demonstrates that approximately an additional 10 dB of attenuation may be obtained along the horizon compared to the zenith. This antenna pattern 44 is in a vertical plane that is perpendicular to the null axis in order to show an omnidirectional nature of radiation pattern in directions that do not include the null. Combining the horizontal and vertical radiation patterns, the horizontal null provides approximately 30 dB of attenuation compared to the zenith.

Further testing of the embodiment included the circular array 10, along with controlling circuitry (not shown) and two beam-forming networks, tested in an anechoic chamber. The circular array 10 and controlling circuitry suppressed an interference signal from a 20-Watt transmitter through a 4 dB antenna that was only about three feet from the array under test, while simultaneously receiving a signal from a much weaker 300 mW transmitter, through a 0 dB antenna that was approximately 25 feet from the array. This transmit-power and distance difference represents approximately a −20 dB SIR, which the array was able to resolve to a full-quieting signal through a receiver that was connected to the array.

Figure 5:
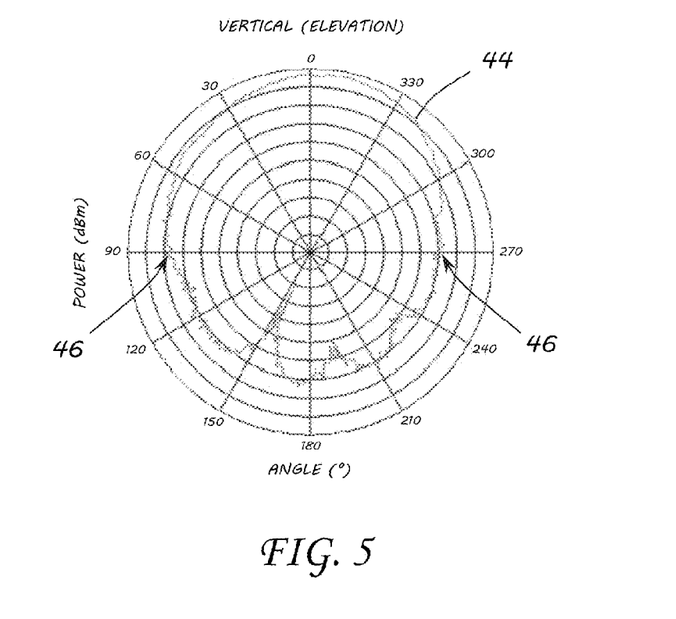
FIG. 5 is a polar graph illustrating an elevation pattern of the antenna array in FIGS. 3A and 3B.

In another embodiment of the invention, two identical beam-forming networks are connected to the array 10, each consisting of amplifiers, programmable phase shifters, and combiners, which formed antenna patterns similar to patterns 36, 38, and 44 in FIGS. 4A, 4B and 5. One of the networks is configured to act as a scanner, continuously rotating the null in azimuth, while an on-board computer controls phase shifters and records a received power level. The scanning channel, in this particular embodiment, utilizes a superheterodyne receiver to detect an incoming interference signal, such as a jamming signal, though other types of receivers may also be used. This channel, in conjunction with the on-board computer, keeps track of the direction of the least power received, and directs the other identical beam-forming network to lock its null toward that direction. This locked-on beam-former may then be connected to a satellite receiver.

As the interference signal changes directions with respect to the array, the system immediately tracks a new angle and updates the required phases in order to steer the null of the second beam-former in that direction, thus maintaining the antenna-pattern null in the direction of the interference signal. Embodiments of the invention allow for this simple tracking routine because if the particular interference signal of concern was present, it always overpowered the satellite signal in the horizon direction, thus eliminating the need for exotic signal-processing algorithms. When the offending transmitter is sufficiently far so that this assumption is invalid, it no longer created an interference problem, and the phases may be adjusted to turn off the null, creating an omnidirectional pattern. For a more general application, when the desired signal cannot be assumed to emit from above the horizon, this simple approach would prove insufficient. However, there are numerous adaptive-null steering techniques that rely on more exotic algorithms that can be combined with this array in other embodiments.

An advantage of embodiments of the adaptive null-steering array over fixed antenna patterns is its ability to track and continuously place an antenna-pattern null in a direction of the interference, even when that direction changes relative to the satellite receiver utilizing the array. Additionally, there are no limits to the number of beam-forming networks that can be attached to the physical radiating elements in order to track any number of interference signals. If any kind of filtering is used, embodiments of the null-steering system assist in avoiding problems associated with adjacent-channel interference from non-ideal filtering. In addition, due to the planar nature of the array, a protective coating may be placed over the radiating elements that allow personnel to stand or walk on the array, without concern for hitting protruding parts, compared to a vertically protruding antenna.

Other embodiments of the invention may make the patterns more omnidirectional outside the null, and make the null more narrow. These embodiments may utilize two additional, but identical, beam-forming networks for a total of four beam-forming networks built into the system. One beam-forming network's antenna pattern would be continuously scanned as set forth above. The other three antenna patterns would combine to form a more ideal pattern that feeds the satellite receiver. Turning now to an exemplary receiver 50 for this embodiment in FIG. 6, a first network antenna pattern 52 received through an antenna 53 and low-noise amplifier 55 by a power splitter/phase shifter 54 is fed to a superheterodyne receiver 56 which sends output to an A/D converter 58 and then to a CPU 60 to track received power as set forth above. However, rather than feeding the satellite receiver with a single redundant beam, as above, three identical beams 62, 64, 66 may be combined using receiver 50.

Figure 6:
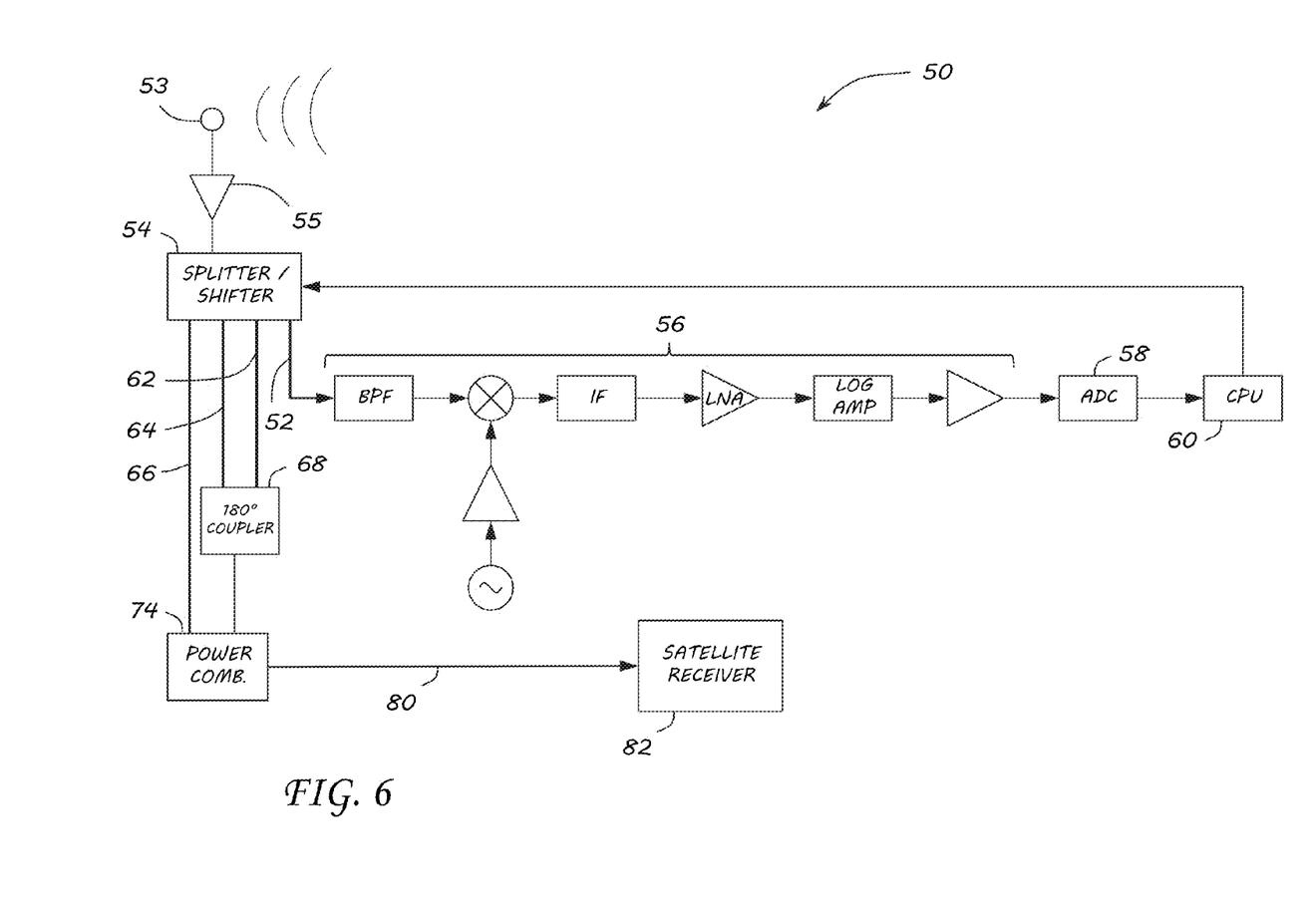
FIG. 6 is a schematic diagram of a four beam receiver network consistent with embodiments of the invention.
Figure 7:
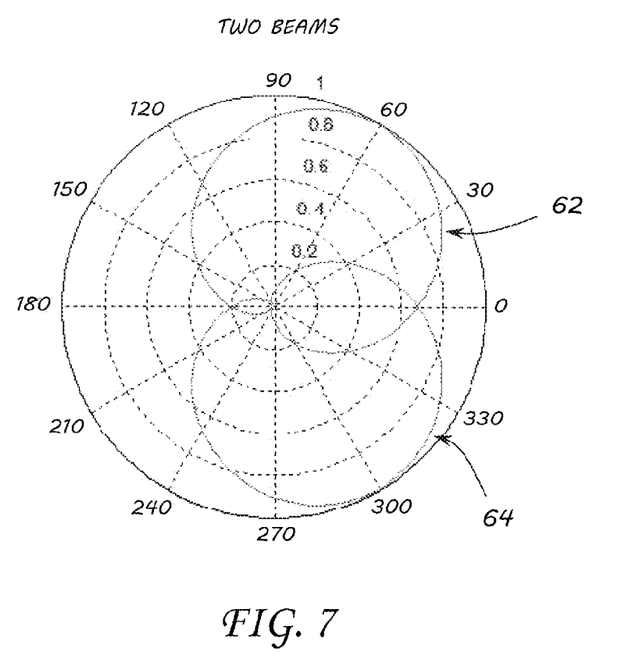
FIG. 7 is a polar graph illustrating two beams steered to different angles.
Figure 8:
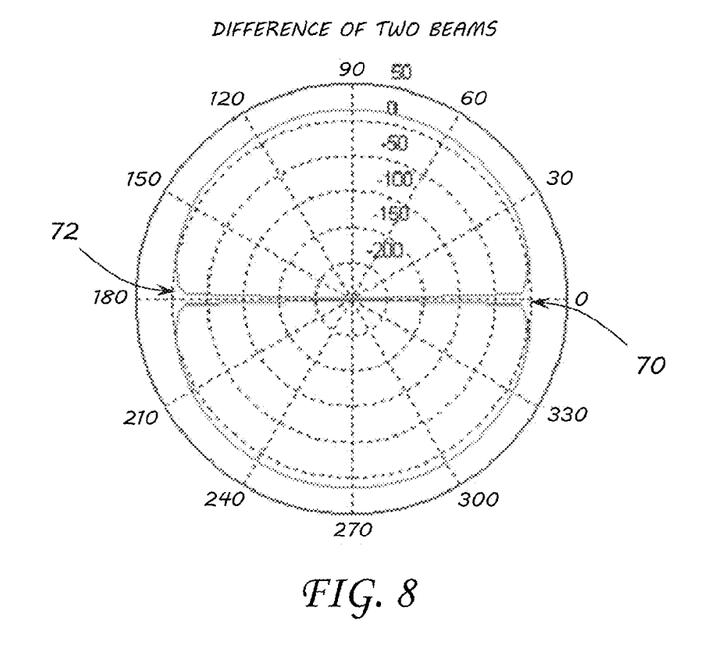
FIG. 8 is a polar graph illustrating an array pattern from the difference in the two beams if of FIG. 7.
Figure 9:
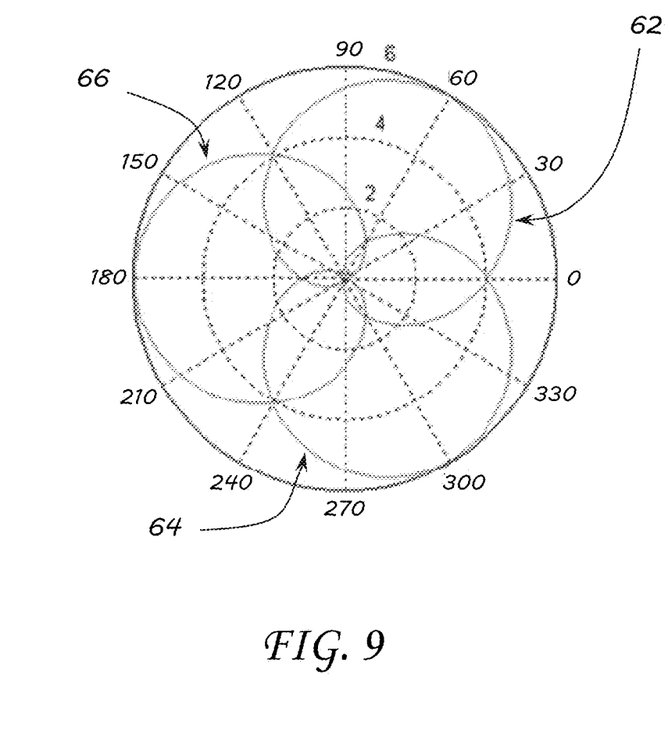
FIG. 9 is a polar graph illustrating three beams steered to different angles.
Figure 10:
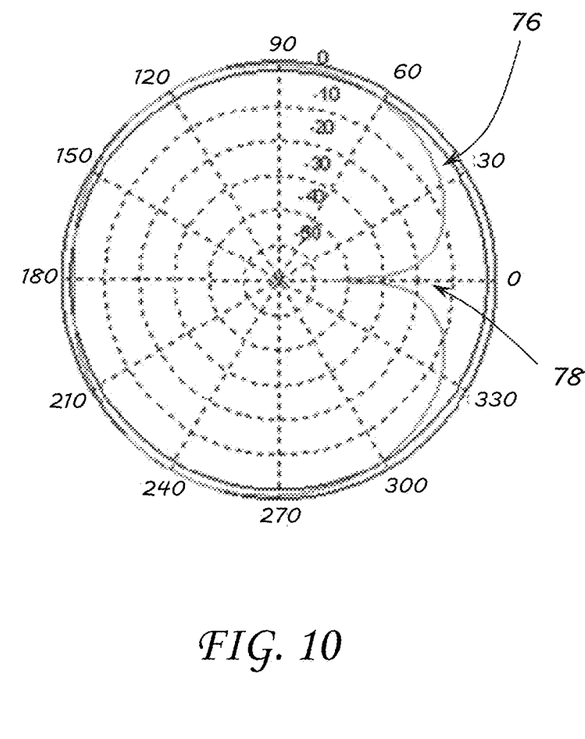
FIG. 10 is a polar graph illustrating a combined pattern of the three beams of FIG. 9.

Two of these three cardioid-shaped beams 62, 64 are steered in slightly different directions, as illustrated in FIG. 7. One of these two beams would be subtracted from the other using a 180-degree hybrid coupler 68. The resulting difference pattern (beam 62−beam 64) creates extremely deep and narrow nulls 70, 72 whenever the power levels from the two patterns are equal as shown in FIG. 8. One of the deep nulls 70, 72 is pointed in the direction of the interfering source. However, there is a 180 degree ambiguity. The third beam 66, shown in FIG. 9, is used to resolve this ambiguity by adding it to the difference pattern (beam 62−beam 64) using a power combiner 74, as shown in FIG. 6. The resultant (beam 62−beam 64+beam 66) antenna pattern is shown in FIG. 10, which illustrates an omnidirectional pattern 76 with a deep narrow null 78. The output 80 from the power combiner 74 may then be sent to a satellite or other receiver 82 for further signal processing.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An antenna array system for reducing interference from a source moving relative to the antenna array system, the antenna array system comprising:
   a first beam-forming network;
   a second beam-forming network;
   a plurality of antenna array elements arranged in a planar array, each of the plurality of antenna array elements in electrical communication with the first and second beam forming networks and in a locationally fixed position relative to the first and second beam forming networks;
   the plurality of antenna array elements receiving a desired signal, and interference from the source moving relative to the antenna array system;
   the first beam-forming network configured to continuously rotate a first deep antenna-pattern null in azimuth while recording a received power level;
   the first beam-forming network further configured to determine a direction of the interference from the received power level;
   the second beam-forming network configured to lock a second deep antenna-pattern null toward the direction determined by the first beam-forming network;
   a third beam-forming network; and
   a fourth beam-forming network;
   wherein the second deep antenna-pattern null is generated from subtracting an antenna-pattern generated from the third beam-forming network from an antenna-pattern generated from the second beam-forming network, and adding an antenna-pattern generated from the fourth beam-forming network.

2. The antenna array system of claim 1, wherein the first beam-forming network comprises:
   a CPU; and
   a superheterodyne receiver,
   wherein the superheterodyne receiver is configured to detect the power level, and the CPU is configured to control phase shifters for steering the second deep antenna-pattern null and recording the detected power level.

3. The antenna array system of claim 1, further comprising:
   a 180-degree hybrid coupler,
   wherein the 180-degree hybrid coupler is configured to subtract the antenna-pattern generated from the third beam-forming network from the antenna-pattern generated from the second beam-forming network.

4. The antenna array system of claim 3, further comprising:
   a power combiner,
   wherein the power combiner is configured to add the subtracted antenna patterns from the 180-degree hybrid coupler with the antenna-pattern generated from the fourth beam-forming network.

5. The antenna array system of claim 1, wherein the plurality of antenna array elements comprise circular patch antennas.

6. The antenna array system of claim 5, wherein the plurality of circular patch antennas are arranged in a circular planar array.

7. The antenna array system of claim 6, wherein each of the circular patch antennas comprise tuned slits.

* * * * *